(12) United States Patent
Reimann et al.

(10) Patent No.: US 6,391,107 B1
(45) Date of Patent: May 21, 2002

(54) METHOD FOR THE UTILIZATION OF RESIDUAL MATERIALS IN THE PRODUCTION OF CEMENT

(75) Inventors: Hanno Reimann, Essen; Götz Reimann, Mülheim; Siegfried Meininger, Essen, all of (DE)

(73) Assignee: E. Schwenk Baustoffwerke KG, Ulm/Donau (DE)

( * ) Notice: Subject to any disclaimer, the term of this patent is extended or adjusted under 35 U.S.C. 154(b) by 1001 days.

(21) Appl. No.: 08/600,165

(22) Filed: Feb. 12, 1996

(30) Foreign Application Priority Data

Feb. 13, 1995 (DE) .......................................... 195 04 668
Jan. 24, 1996 (DE) .......................................... 196 02 321

(51) Int. Cl.$^7$ ................................................ C04B 7/24
(52) U.S. Cl. .................... 106/739; 106/745; 106/755; 106/758
(58) Field of Search ........................... 106/739, 745, 106/755, 758, 722, 752

(56) References Cited

U.S. PATENT DOCUMENTS

| | | | | | |
|---|---|---|---|---|---|
| 1,220,735 A | * | 3/1917 | Elsner | ...................... | 106/745 |
| 3,865,602 A | * | 2/1975 | Stich et al. | ................. | 106/761 |
| 4,022,629 A | * | 5/1977 | Garrett et al. | ............. | 106/758 |
| 4,022,630 A | * | 5/1977 | Watson et al. | ............. | 106/745 |
| 4,081,285 A | * | 3/1978 | Pennell | ...................... | 106/745 |
| 4,238,237 A | * | 12/1980 | Jarrett et al. | ................ | 106/758 |
| 4,256,503 A | * | 3/1981 | Tsuda et al. | ................ | 106/758 |
| 4,260,421 A | * | 4/1981 | Brown et al. | ................ | 106/758 |
| 4,678,514 A | * | 7/1987 | Deyhle et al. | .............. | 106/745 |
| 4,913,742 A | * | 4/1990 | Kwech | ....................... | 106/758 |
| 5,049,198 A | * | 9/1991 | Ribas | ......................... | 106/739 |
| 5,496,404 A | * | 3/1996 | Price et al. | ................. | 106/745 |

FOREIGN PATENT DOCUMENTS

| | | | | | |
|---|---|---|---|---|---|
| GB | 0981025 | * | 1/1965 | ................. | 106/752 |
| GB | 1037193 | * | 7/1966 | ................. | 106/752 |
| GB | 1112180 | * | 5/1968 | ................. | 106/745 |
| GB | 1187036 | * | 4/1970 | ................. | 106/752 |
| JP | 359045948 | * | 3/1984 | ................. | 106/745 |
| JP | 0102845 | * | 6/1984 | ................. | 106/722 |
| SU | 000937392 | * | 6/1982 | ................. | 106/745 |

* cited by examiner

Primary Examiner—Paul Marcantoni
(74) Attorney, Agent, or Firm—James Creighton Wray; Meera P. Narasimhan

(57) ABSTRACT

Within the known Müller-Kühne process and a corresponding installation, a utilization of a great variety of residual materials can be achieved with optimum process control, both in regard to the production of a raw powder and the fuel, whereby this is made possible in particular in that the raw powder components and the fuel components also are, with respect to the residual materials being used, stored separately, conditioned, and then mixed according to the formulation under strict monitoring. The flue gas is used for preheating the raw powder by adding the cold raw powder to it. This simultaneously removes sticky components from the flue gas. The raw powder preheated in this manner, and also the raw powder or dust recovered in subsequent dedusters are returned to the rotary drum kiln, whereby the solid and other fuels are used and burned with a mutually supportive flame at the opposite end of the rotary drum kiln.

6 Claims, 3 Drawing Sheets

METHOD FOR THE UTILIZATION OF RESIDUAL MATERIALS IN THE PRODUCTION OF CEMENT

BACKGROUND OF THE INVENTION

The invention relates to a method for the combined utilization of residual materials which are fed to the rotary drum kiln in processed form with the raw powder during the production of cement and sulfuric acid according to the so-called Müller-Kühne process and are split off by using chemically reactive carbon which also consists partially of residual materials, at a temperature of over 700° C. with the calcium sulfate, whereby the CaO is then calcined at a temperature of over 1,200° C. in the presence of $SiO_2$, $Al_2O_3$, and $Fe_2O_3$ into cement, and the $SO_2$-containing flue gas is freed from dust, washed, mixed with air, and converted to $SO_3$ or $H_2SO_4$. The invention relates also to an installation for performing said method which comprises a comminution device for the raw powder components, silos, drying drums, a final comminution device, the raw powder silo, the rotary drum kiln, the burner with burner pipe, the clinker discharge and the cement processor, the flue gas discharge chamber, the deduster, the flue gas washer, and the $H_2SO_4$ plant.

The Müller-Kühne process is based on a reducing splitting-off of calcium sulfate at temperatures of over 700° C. using carbon. The calcium sulfite, which forms as an intermediary product, reacts with the excess calcium sulfate to form calcium oxide and sulfur dioxide. The cement clinker which forms during the calcination of the CaO essentially consists of tricalcium silicate, dicalcium silicate, tricalcium aluminate, and tetracalcium aluminate ferrite. The starting material for the classic process consisted essentially of the natural materials anhydrite, coke, raw clay, raw sand, gravel, roasting residue, gypsum, and brown coal dust. The moist starting materials were dried, dosed by weight, and then comminuted and mixed in a ball mill. The resulting raw powder is fed into a slightly angled rotary drum kiln and passes through the latter in counterstream to the combustion gas whereby, as a rule, brown coal dust was used. This classic gypsum sulfuric acid process is economically inferior to standard cement production processes. The economy of the process can be improved, however, by utilizing residual materials from other production processes, which are problematic to store. The substitution of the traditional natural raw materials and primary energy medium, that is, brown coal, with suitable residual materials which can be utilized materially and/or energetically is a significant advantage (Chemische Rundschau No. 38, Sep. 24, 1993, p. 11). A great variety of residual materials has been tested, for example, waste gypsum, waste lime, waste sulfuric acid, acid tars, acid resins, brown coal filter ash, construction debris, used porcelains, podsol, and many others. The disadvantage is that the corresponding raw powder components, but also the fuel components, exert a different influence on the process and final products, that is, as well on the cement as on the sulfuric acid and oleum. In addition, this also does not provide for a consistent process control, especially since the following operating stages, such as, for example, dedusting and gas processing, are greatly influenced in their effectivity by the composition of the starting materials.

The invention is thus based on the objective of further developing the Müller-Kühne process and create an installation in a manner so as to enable a further protection of the resources, on the one hand, and landfill space, on the other hand, while observing and meeting environmental regulations and economy.

SUMMARY OF THE INVENTION

According to the invention, this objective is realized in that the raw powder components and the fuel components, which include the residual materials to be used, including the compensation and reaction substances required for eliminating components untypical for cement, are stored separately, conditioned, and are then added in accordance with the specified formulation and monitored by way of sampling and sample evaluation; the liquid and solid residual materials to be used as fuel are transported separately to the rotary drum kiln and are then burned with a mutually supportive flame; and the flue gases of the kiln hood and the fuel gas discharge chamber are flash-cooled by feeding in cooling gas.

The incoming residual materials are, like the remaining raw powder and fuel components, stored separately and are then added to the process comminuted and homogenized according to the respective formulation and mixed with each other. The fact that the individual starting products have been previously tested and are also being tested during and following their being mixed, makes it possible to always make available and add a starting product which corresponds exactly to the specified formulation and thus to an optimum process. As needed, compensation and reaction materials are added in order to eliminate components untypical for cement, said materials resulting in a recombustion of trace contaminants, for example, in the rough dust chamber, in order to prevent obstacles in the process further on or problems in regard to the clinker. This ensures a continuously consistent process, even though a great variety of materials and also in changing compositions, are used. By forming corresponding buffers, any difference over time can be compensated, so that, for example, products accumulating in different amounts due to seasonal circumstances can also be available in optimum amounts and can be added accordingly. In addition to large accumulation amounts which, however, also must be combined according to material groups of a similar composition, there are a number of valuable concentration products for CaO, $SiO_2$, $Al_2O_3$ and $Fe_2O_3$ which are collected and kept available for formulation corrections. By intermediate sampling additional knowledge is obtained which results in possibilities for correcting the raw powder product. An adequate analysis speed hereby can be ensured, in particular in that the analysis method is changed away from molten product to the "prepared tablet". This continuous accompanying analysis makes it possible to advantageously compensate for the high dispersion or band latitude of the starting base of the raw powder. By adjusting the raw powder, the kiln operation and the produced clinker can be made more uniform. This ensures an improvement regarding the certain reproducibility of the clinker, and thus the certain predetermination of the cement quality. The combined addition of the various fuel components into the rotary drum kiln and the partially inter-supporting combustion ensure that a flame which is advantageous for the conversion process is always available. In particular, this also provides the possibility to completely eliminate solid fuel, such as coal, for longer periods and to use, instead, residual fuel materials, such as, for example, wood chips and saw dust saturated with residual materials, ensuring an advantageously uniform flame. The long flame, which is formed, for example, when saw dust is burned, is advantageously supported by the short flame of the solvent and the high-energy and hot flame of the old oil, as well as of the acid tar and acid resin. The flame reaches far into the rotary drum kiln and thus is able to make a safe contribution to an advantageous burning process. The quenching of the flue gases and the fact that the kiln hood and flue gas discharge chamber are sealed advantageously prevents damaging alkali precipitations. In addition, this feeding-in of cooling gas generates a vacuum with an advantageous effect on the entire burning process. This withdrawal of the flue gas manifests itself up to the area of the clinker discharge. The greater amount of flue gas flowing through the rotary drum kiln per time unit ensures optimum combustion of the residual materials. The sealing of the kiln hood hereby ensures that this suction for the flue gas acts far into the rotary drum kiln without drawing in secondary air at wrong places.

According to a useful embodiment of the invention, it is provided that the anhydride content in the raw powder is replaced with 20–100% of residual material. A respective high anhydride content was necessary in the past in order to ensure an operation which was somewhat flawless. Based on the measures according to the invention, this anhydride content can now be reduced advantageously to zero. The same applies to the other components, such as sand, clay, and ferric oxide, which are replaced with power plant furnace ashes, filter dust, etc.

A further improvement of the process can be achieved in that raw powder is added to the flue gas after the same leaves the rotary drum kiln, and in that this raw powder is added only then and with admixture of the dust from the kiln feed. The cold raw powder otherwise forms the condensation point for the hot and sticky starting dust, which then bakes together with the cold dust, and together with it is then added and sticky into the following cyclone of the kiln feed.

The process in its entirety becomes essentially independent from variations in the added products if, as has been provided according to the invention, moist and/or rough and/or hydrocarbon-contaminated mineral starting materials, to the extent necessary, are comminuted, dried, and possibly subjected to pyrolysis, and ground. This provides for the possibility to also safely prepare different starting products to such an extent that they can then be processed according to the process.

According to a useful further development of the invention it is provided that the nozzling in of coal and/or the nozzling in of saw dust saturated with hydrocarbons or similar materials, and/or the nozzling in of sulfuric acid is performed with simultaneous generation of a surrounding combustion mantle created by surrounding lances for liquid fuels, whereby the carbon content is preferably replaced wholly with hydrocarbons and/or other liquid residual materials. By performing the process in this manner, the long flame generated when burning the saw dust is specifically compensated whereby, depending on the number of fuel components used, the individual lines and burners arranged at the end are arranged so as to surround the discharge of the solid fuel pipe or, in particular, are arranged below it, so that a specific influence of the burning out of the saw dust is ensured.

A removal of the metals and alkalis is made possible if the dust enriched with alkali chloride and alkali sulfate is separated into metals, alkalis, and neutral mineral substances also by separate treatment utilizing the paramagnetic effect and returned to the rotary drum kiln while removing the alkalis and metals. The fractionated separation and utilization of the paramagnetic effect also can be extended, if needed, to the other dusts and results in an advantageous, uniform separation and also makes it possible that these products can be reused accordingly. Problematic alkalis and metals are removed.

It is useful that withdrawn odor-intensive, organic products generated during the processes are fed together with primary air to the rotary drum kiln. It is also conceivable that they are fed to so-called biofilters.

In order to avoid dust in the entire process, it is advantageous that the previously fluidized and homogenized raw powder is shaped into pressed parts prior to being fed into the rotary drum kiln. The pressed parts in the rotary drum kiln then advantageously result in a cleaning of the kiln wall, so that the double effect also can be used advantageously for similar processes.

The process is performed with an installation in which the comminution device for the raw powder components and compensation and reaction materials is preceded by separation silos, and in which individual tanks and silos are provided also for the various fuel components and are equipped with a controlled discharge; in which the feed lines for the liquid, gaseous and solid fuel components are surrounded by the burner pipe so as to leave flow channels, whereby the feed lines extend below the solid fuel pipe and discharge into the rotary drum kiln; in which the raw powder feed and the dust discharge of the flue gas discharge chamber are provided with sealing systems; and in which a blow jet cooler is disposed in the flue gas stream behind the flue gas discharge chamber. Depending on the construction of the installation, the individual raw powder components and fuel components can be stored separately and can then be combined according to the optimum process and formulation. This optimum feed material is then further processed in the rotary drum kiln, whereby this is supported in that the combined feeding of the individual fuel components ensures optimum flame formation. The combination burner is constructed so that the solid fuel flame is specifically supported or supplemented by the flames of the other components. The specific vacuum in the flue gas discharge chamber has a double effect on the blow jet cooler, whereby the suction effect is manifested far into the rotary drum kiln.

A corresponding stable construction of the burner pipe is hereby provided in that the feed lines are provided with a mantle pipe in which, in addition to the medium pipe, a blower air pipe and/or a disperser medium pipe are disposed so as to extend parallel to each other. The individual fuel components are thus passed separately into the rotary drum kiln and fed there in such a way that they always can be burned with separate but mutually supportive flame. The individual fuel components are hereby transported in the medium pipe to the burner and are completely and intensively burned, because blower air and, if needed, a dispersion medium, are added parallel or simultaneously. A possible dispersion medium is either steam or compressed air, whereby these materials contribute to the optimum dispersion or distribution of the fuel component, which again results in the specific combustion and complete combustion.

This intensive intermixing of the individual components with the required air and the corresponding division into the smallest possible droplets or components is ensured in particularly in that the mantle pipes of the lines serving as an acid tar line, old oil line, oxygen line, solvent line, accumulated acid line, or viscous oil line are constructed so as to merge with a burner nozzle, whereby the blower air pipe and/or the disperser medium pipe merge into a discharge channel which surrounds the center medium pipe discharge, said discharge channel being formed by the walls of a spin body and an injector cap and discharging at an angle onto the center line of the medium pipe.

In order to be able to utilize the thermal energy in the flue gas, the invention provides that the E-filter associated with the deduster is preceded by a heat exchanger or residual heat boiler which is associated with a blower in the line to the E-filter, and a return blower in the line to the blow jet cooler. Such an association can be accomplished advantageously because the elevated pressure loss via the heat exchanger system is absorbed by the additional blower behind the residual heat boiler. This technical accessory in particular decisively improves the energy utilization balance. The residual heat boiler also provides the condition for an energy station in which the excess steam can be converted into electric energy.

It is useful that the residual water leaving the blow-off tower is further treated, whereby the discharge of the blow-off tower is connected to a 3-stage stirred tank cascade and a chamber filter press or special electrolysis installation with separate separation and extraction of the metals. The special electrolysis installation in particular makes it possible to separate the various accumulating metals separately and extract them, so that they can be made available for smelting again.

The invention is characterized in particular in that it makes available a process and an installation which ensure a significant improvement of the Müller-Kühne process, with regard to process control and safety as well as economy. This makes it possible to add further residual materials to the raw powder as well as to use a great variety of fuel components so that the above mentioned protection of resources, on the one hand, and the protection of landfill space, on the other hand, can be achieved with the necessary safety. It is hereby particularly advantageous that, from an energy standpoint, a largely self-sufficient operation is possible, which also excludes environmental burdens.

Other details and advantages of the object of the invention can be derived from the following description of the corresponding drawing which shows a preferred exemplary embodiment with the necessary details and parts. In the drawing:

DETAILED DESCRIPTION OF THE PREFERRED EMBODIMENT

Figure 1:
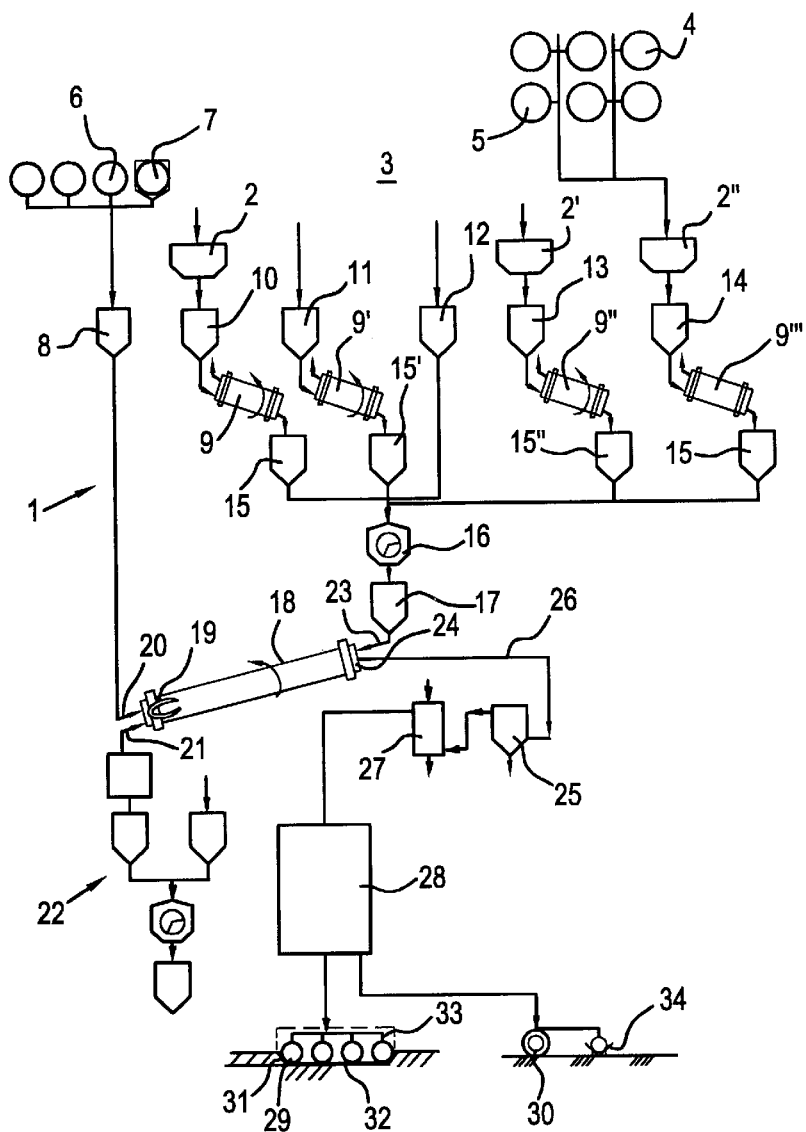
FIG. 1 shows a simplified schematic of an entire installation for producing cement and $H_2SO_4$ according to the Müller-Kühne process.

FIG. 1 shows the schematic of an installation functioning according to the Müller-Kühne process and used to produce cement and $H_2SO_4$, as well as oleum. The comminution device for the comminuter [sic—comminuting] the raw powder components is preceded by a sufficiently sized storage space with a number of separating silos 4, 5. These may include reactive gypsum, residual water treatment sludges, products from accidental spills, power plant fly ash, spray absorption products, fluidized bed ash, as well as residues from trash combustion plants, and, among other things, flue dust or black lime, old catalysts, sands, porcelains, pyrolysis residues, lime sludge, gypsum sludge, fell sludges, construction debris and contaminated soils, mineral fibers, including asbestos, foundry waste, sand catcher material, blasting sand, swept road dirt, clarification sludge, paper sludge, harbor silt, etc.

The various components used as fuels are also kept available in tanks 6 or silos 7 and are then added, following proper conditioning, via an intermediate silo 8 to the process. In addition to brown coal dust, these include acid tar, old oil, solvents, waste acid, viscous oil, as well as also oxygen and similar gaseous products.

The raw powder components, in contrast, are added, for example, in the form of sand, from the intermediate silo 10 to a drying drum 9, where they are then conditioned accordingly. Numeral 11 stands for the intermediate silo containing sand and roasting residue, 12 for the intermediate silo containing coke, 13 for the intermediate silo containing the anhydride, and 14 for the intermediate silo containing other raw powder components. After passing through the drying drum 9, 9', 9", 9''', the raw powder prepared in an appropriate manner is stored in a raw powder silo 15, from where it passes through the final comminution device 16, when needed and according to formulation, whereby both a further comminution and mixing is performed. The raw powder, which is then finished, is stored in the finished powder silo 17.

According to the illustration of FIG. 1, the corresponding finished powder is fed into the rotary drum kiln 18 in counterstream to the fuel which reaches the rotary drum kiln 18 via the burner pipe 20 and burner 19.

The produced clinker is withdrawn via the clinker discharge 21 and is then processed in the cement processor 22 until it can be sold as a finished product.

The raw powder stored in the finished powder silo 17 is fed via the raw powder feed 23 through the flue gas discharge chamber 24 into the rotary drum kiln 18. The flue gas leaves the flue gas discharge chamber 24 via the flue gas line 26 and reaches the $H_2SO_4$ plant 28 via the deduster 25 and flue gas washer 27.

The final products, $H_2SO_4$ and oleum, are stored in containers 29 and tanks 30, whereby these containers are located inside a large collection trough 31. The collection trough 31 has a container bottom 32 which enables continuous monitoring and thereby excludes a discharge of $H_2SO_4$ and oleum into the environment.

The collection trough 31 is secured with a roof, where a suction device 33 also ensures that residual gases cannot be released into the environment. The individual loading stations are also provided with a loading collection cup 34 in order to ensure optimum environmental safeguarding in this manner.

Figure 2:
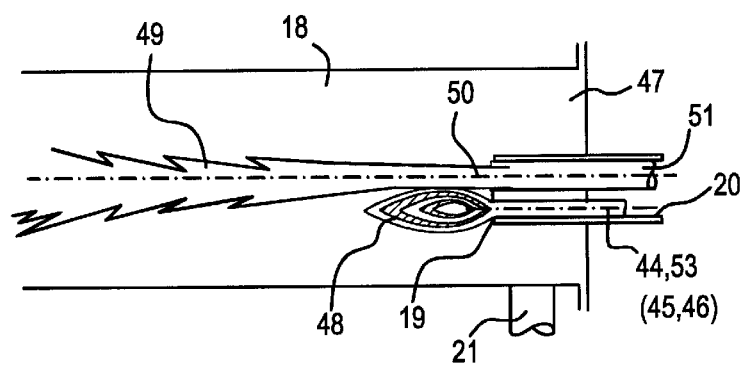
FIG. 2 shows a section through the rotary drum in the area of the fuel feed.

FIG. 2 shows a section of the fuel side of the rotary drum kiln 18. The various feed lines 44, 45, 46 pass, surrounded by the burner pipe 20, into the rotary drum kiln 18. They exit at a distance to the backwall 47 of the rotary drum kiln 18, whereby they end at approximately the same height; while the feed lines 44, 45, 46 are provided with a burner 19, the solid fuel pipe 51, as a rule, does not have such a built-in part. The flame, assigned with numeral 49, is a wood chip or saw dust flame which reaches far into the rotary drum kiln 18 due to impulse forces and moisture influence, and is supported by the medium flame 48 or a corresponding number of flames. The saw dust discharge is designated with 50.

Figure 3:
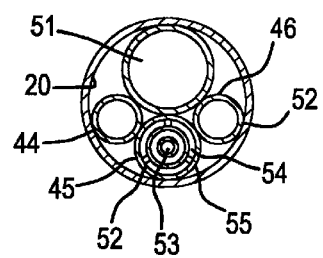
FIG. 3 shows a cross-section through the burner pipe.

The feed lines 44, 45, 46, here for acid resin, solvent, and waste acid, are provided with a mantle pipe 52 which again is provided with the medium pipe 53, a blower air pipe 54, and a dispersion medium pipe 55. FIG. 3 shows this accordingly. FIG. 3 also shows that these individual mantle pipes 52 or feed lines 44, 45, 46, and the solid fuel pipe 51 are arranged inside the burner pipe 20 so as to leave hollow spaces, thus resulting in flow channels which ensure the corresponding cooling and also make it possible for additional combustion air to be fed into the area of the burner nozzles 57 or burners 19.

Figure 4:
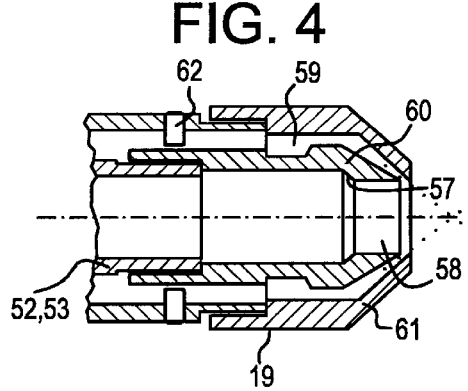
FIG. 4 shows a section of the liquid burner itself.

A burner nozzle 57 of this type is shown in FIG. 4, whereby a section through this burner nozzle is shown here. The burner nozzle 57 forms the front end of the burner 19, whereby the medium pipe discharge 58 is surrounded in ring-shape by a discharge channel 59. This discharge channel 59 is formed by a spin body 60 and an injector cap 61, creating an air or medium stream which divides the medium jet leaving the medium pipe discharge 58 so finely that a medium stream which is advantageously suited for combustion is obtained. The burner nozzle 57 is connected via retaining screws 62 with the mantle pipe 52 or the medium pipe 53.

Figure 5:
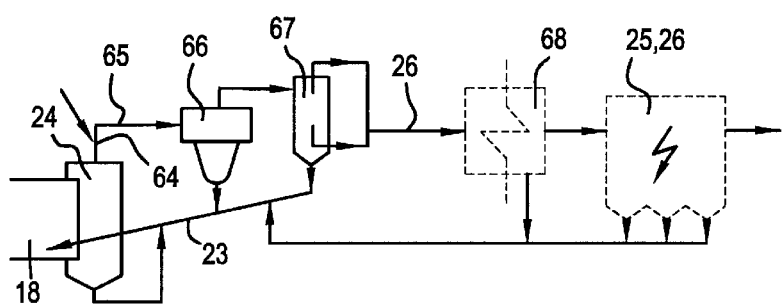
FIG. 5 shows the installation parts following the flue gas side, with the raw powder preheater.

FIG. 5 shows the rotary drum kiln end with the flue gas discharge chamber 24. The flue gas leaves the flue gas discharge chamber 24 at the top end via ascending line 65. This ascending line 65 is provided with a sluice 64 for the cold raw powder. This raw powder is carried along via ascending line 65, is then separated in the cyclone 66 or the following high-performance cyclone 67, and is transferred to the raw powder feed 23. The warm raw powder withdrawn at the bottom of the flue gas discharge chamber 24 is also fed accordingly over a short distance to the raw powder feed 23.

The hot flue gas is passed via the flue gas line 26 through a residual heat boiler 68, and finally any additional dust is removed from it in the electrostatic filter 69. The dust separated here is also fed to the raw powder feed 23.

Figure 6:
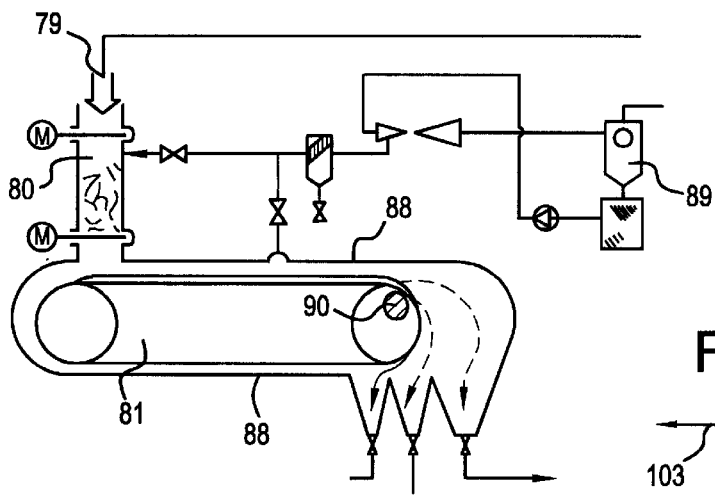
FIG. 6 shows a magnetic separator suitable for treating fine dust.

As already mentioned, FIG. 6 shows a special embodiment of a magnetic separator 81, whereby the magnet switch [sic] 81 enclosed in a tight housing 88 is connected with its permanent magnet 90 to a vacuum generator 89. This makes it possible that the entire housing or the entire magnetic separator 81 can be operated in a vacuum, so that fine dusts can be separated into metals, alkalis, and neutral mineral substances by utilizing the paramagnetic effect. They collect in the individual funnels and can be removed accordingly without any negative effect on the system. 80 stands for the corresponding sluice which separates the magnetic separator 81 from the transport or last chamber 79 of the electrostatic filter 69.

Figure 7:
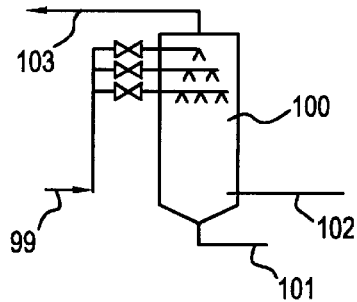
FIG. 7 shows a simplified illustration of the blow-off tower.

The cooling tower is connected via the connection line with the empty tower, in which the raw gas initially is subjected to evaporative cooling. The excess water removed from the cooling tower is used for this purpose. The excess part is fed according to FIG. 7 via residual water line 99 to the blow-off tower 100. Quenching water is nozzled into the blow-off tower, and dissolved $SO_2$ is expelled to the air counterstream. The forcing in of the air is accomplished via a flap on the blow-off tower and is made possible by the vacuum generated by the blowers. The blown off air is fed into the raw gas stream between the empty tower and the cooling tower. 102 stands for the feed air line, 103 for the blow-off air line. The draining acidic water leaves the blow-off tower 100 via the discharge line 101. The acidic water is then treated further in the residual water treatment (not shown here), that is, in a 3-stage stirred tank cascade, to such an extent that subsequently reusable filter cake and water to be disposed of properly remains.

So far, the raw powder flows gravimetrically from a kiln silo (not shown in FIG. 8) via an angled feed pipe into the cold kiln side of the rotary drum kiln 18. By way of the rolling and roll-over movement of the raw powder, about 16% are removed as dust and recovered mainly via gravity separator systems and transported via Redler conveyor systems to the raw powder processing and storage area, where they are returned as a supplemental amount to the raw powder again. In order to avoid a dedusting accumulation with unequal fractions in the rotary drum and a difficult return, while keeping the kiln hood area, and thus the flue gas discharge chamber 24, tight, sealing systems 114, 115 and 117, 118 in the form of double or duplex swivel flaps have been provided. The material accumulating in the flue gas discharge chamber 24 is hereby transferred via the discharge scraper 116 to the bucket elevator 119 or Redler conveyor system and transported back via the raw powder feed 23 into the rotary drum kiln 18.

This securing of the flue gas discharge chamber 24 and the subsequent blow jet cooler 120 with nozzles 121, 122 makes it possible to improve the entire process. Alkali compounds preferably precipitate at the previously existing secondary air sources and, among other things, form lumps, clods, and baked-together pieces which are now avoided, so that daily humanly degrading poking work is no longer unnecessary. This is also greatly helped by the avoiding of angled walls in the hot gas area, as well as by the already mentioned flash-like nozzling of the flue gas with cold gas (for example, air) via the already mentioned nozzles 121, 122 from the mantle, possibly supported by a central nozzle with a blocking curtain effect. This spray nozzle is arranged between the transition pipe between the kiln hood, that is, flue gas discharge chamber 24 and rough dust chamber 70. The cooling effect is set so that a cold zone of approximately 600° C. is created behind nozzles 121, 122. By way of the $O_2$-enriched gas feeding, any possible elevated Co contents are oxidized further to $CO_2$; the same applies for sulfur, etc., and unburned material, so that an additional safeguarding of the process in the form of micronal recombustion is achieved in an advantageous manner. It is possible to use both air as well as cooled and returned flue gas as a cooling gas. Depending on the gas temperature status, the propellant gas changes, as does the preservation of the associated suction effect in connection with the blowing pressures. In relation to a flue gas stream of 18,000 $Nm^3/h$, the following values apply approximately:

| 20° C. | −2,000 $Nm^3/h$ air | 6 bar pressure |
|---|---|---|
| 250° C. | 6,000 $Nm^3/h$ gas/flue gas | 0.5 bar pressure, and |
| 350° C. | 8,000 $Nm^3/h$ flue gas | 0.25 bar pressure. |

Air can be used in the low temperature range since these amounts, which correspond approximately to current secondary air infiltration, displace them and can be very easily removed by the suction train blower of the entire system.

The large amounts and higher temperatures apply to flue gas which is being returned. Here, a limitation is less necessary as long as the flue gas transport paths are able to handle this. Of special significance is the blowing pressure and the resulting vacuum effect which can only become effective via a previously sealed kiln hood. This results in a suction effect which acts even inside the kiln at the burner stand or clinker discharge 21.

Figure 8:
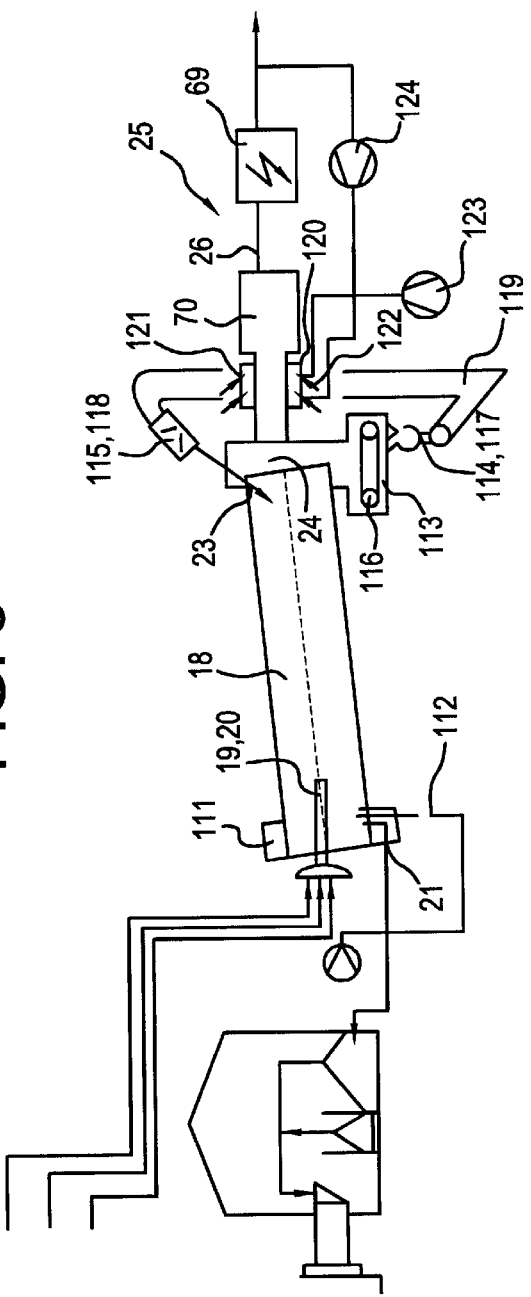
FIG. 8 shows a schematic with a device for introducing secondary combustion air and cooling gas.

According to FIG. 8, the rotary drum kiln 18 operates with a planetary cooler 111 at the clinker discharge 21. This means that the secondary combustion air drawn in via the planetary cooler or the planetary coolers 111 through the secondary air feed line 112 simultaneously cools the discharging clinker in a counterstream.

113 stands for the dust discharge at the flue gas discharge chamber 24 which has already been explained above.

By replacing the coal dust fuel with waste products or residual products, increased amounts of $H_2$ appear in the flue gas mixture, thus almost doubling the flue gas volume stream. This water steam contingent constantly pushes away the secondary air needed at several points (clinker cooling, fuel conversion, kiln gas temperature regulation) and causes unpleasant accompanying phenomena, such as too hot clinker, glowing planetary cooler 111, glowing or too hot clinker burning zone, too hot flame, and incomplete combustion, possibly promoting furnace deposits in the kiln center. By using the blow jet device or blow jet cooler 120, this simultaneously, and due to very different reasons, helps in the transport in that it pulls through more flue gas and, in addition, draws in the urgently needed secondary air via the planetary coolers 111. The mode of operation of the rotary drum kiln 18 then can be adjusted in a reproducible manner by means of such an operating element.

By introducing the heat exchanger as a residual heat boiler for utilization of the residual heat, a strong alkali deposit must be expected on the cooler heating surfaces. It could be that the considerable deposits no longer can be managed by the cleaning system of the boiler. By applying suction to the rotary drum kiln 18 and transferring the vacuum to the rotary drum, the suction train blower behind the residual heat boiler could be overburdened. The gas guidance chamber is kept insulated up to the spray nozzle, so that no alkali salts precipitate further. Following the cooling shower in the blow jet cooler, the adhesion phase of the salts has been overcome, and no danger is expected any longer.

Figure 9:
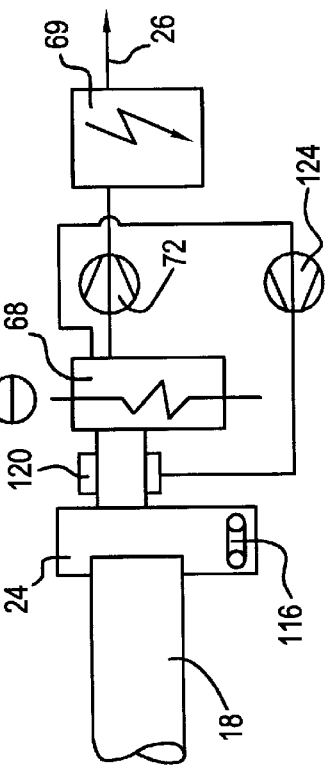
FIG. 9 shows another variation of this area which is shown in particular in FIG. 14.

For the precipitation cooling of the alkalis, part of the flue gas would have to be returned to the spray nozzle behind the residual heat boiler and be fed in. This again results in unfavorable amounts of alkali dust, however no longer in sticky form, which precipitates by itself in the residual heat boiler. Adhesions can be easily removed here. A correspondingly charged arrangement is shown in FIG. 9, whereby the residual heat boiler 68 acts partially as a rough dust chamber which is associated with appropriate blowers behind a hurriclone. In order to keep the blower performance low, a return blower 124 is provided here, that is, as a supplement to the blower 72 which returns part of the flue gas stream, as mentioned above, to the blow jet cooler 120. Thus, the compressed air compressor 123 of FIG. 8 for supplying the blow jet cooler 120 becomes unnecessary. The withdrawal blower 72 (100 mmWS), for example, has a capacity of 20,000 $Nm^3/h$, while the return blower (0.5 bar) is designed, for example, for 6,000 $Nm^3/h$.

All mentioned features, including those derived exclusively from the drawings, are considered as essential to the invention, both alone and in combination.

We claim:

1. A method for combined production of cement and sulfuric acid by Muller-Kuhne process comprising:

storing powder components used in the process separately, the components including waste material, unprocessed powder components, fuel components, and residual components;

conditioning the components by comminuting;

taking a sample of the components and evaluating the sample for determining its composition;

formulating a required composition of the feed mix;

combining the components for forming the formulated feed mix;

feeding the mix to a rotary drum kiln;

transporting a fuel mix comprising liquid and solid residual materials, separately to the rotary drum kiln;

burning the fuel mix in a flame, for forming active carbon;

burning the feed in the flame at a temperature of over 700° C., for forming CaO and flue gases;

calcining the CaO at a temperature of over 1,200° C. in the presence of SiO2, Al2O3, and Fe2O3 for forming cement;

feeding cooling gas and flash-cooling flue gases in a kiln hood and a fuel gas discharge chamber; and exhausting SO2-containing flue gases, removing dust, washing the SO2, mixing with air and converting to SO3 or H2SO4.

2. The method of claim 1, further comprising replacing 20–100% of an anhydrite content in the unprocessed powder components with the residual components.

3. The method of claim 1, wherein the residual components are selected from a group consisting of moist and rough hydrocarbon-contaminated mineral, and wherein conditioning the components comprises comminuting, drying, pyrolyzing and grinding the components.

4. The method of claim 1, wherein burning the fuel mix in the flame comprises supplying substances selected from a group consisting of coal, and saw dust saturated with hydrocarbons, and sulfuric acid, and further comprising simultaneously lancing in a surround of liquid fuel for generating a surrounding combustion mantle.

5. The method of claim 1, wherein removing dust further comprises utilizing magnetic separation for separating the dust into metals, alkalis and neutral mineral substances, and further comprising returning the neutral mineral substances to the rotary drum kiln for reprocessing.

6. The method of claim 1, wherein forming the feed mix and feeding the feed mix to a rotary drum kiln further comprises shaping the feed mix into pressed parts for feeding to the rotary drum kiln.

* * * * *